H. W. MUELLER.
ATTACHMENT FOR MOWERS.
APPLICATION FILED MAY 13, 1914.
1,172,033.
Patented Feb. 15, 1916.
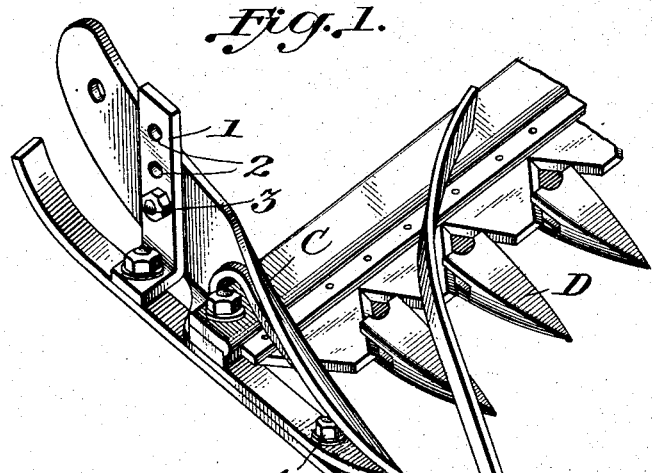
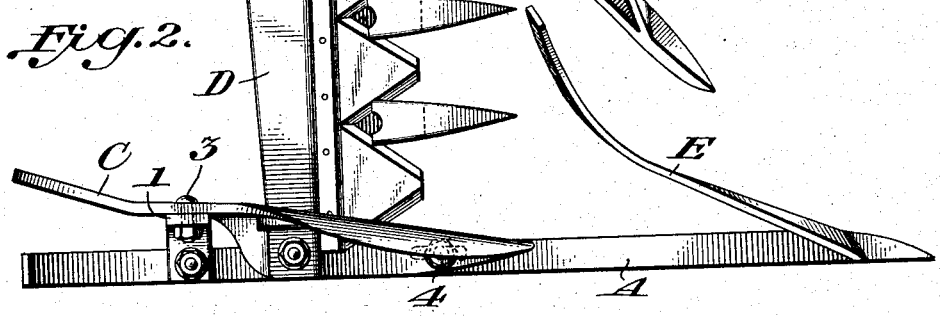
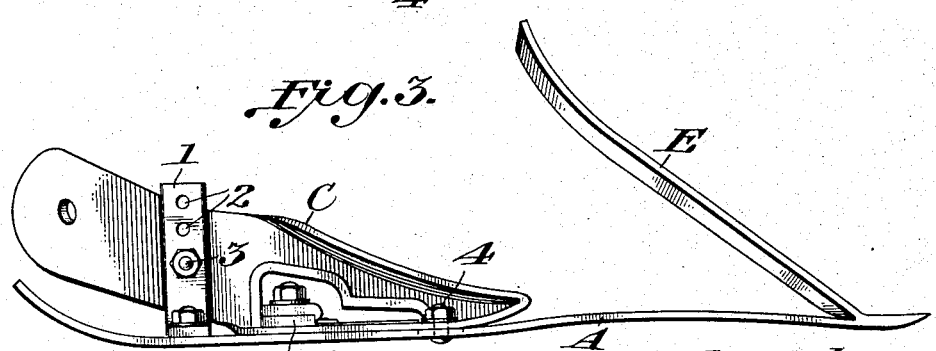

UNITED STATES PATENT OFFICE.

HERMANN W. MUELLER, OF VON ORMY, TEXAS, ASSIGNOR OF ONE-HALF TO GUSTAV ELLEY, OF SEGUIN, TEXAS.

ATTACHMENT FOR MOWERS.

1,172,033.   Specification of Letters Patent.   Patented Feb. 15, 1916.

Application filed May 13, 1914. Serial No. 838,358.

*To all whom it may concern:*

Be it known that I, HERMANN W. MUELLER, a citizen of the United States, residing at Von Ormy, in the county of Bexar and State of Texas, have invented certain new and useful Improvements in Attachments for Mowers, of which the following is a specification.

My invention relates to an improvement in attachments for mowers, and the object is to provide an attachment which can be connected to the shoe of the sickle bar to raise the grain or other growth being cut and bring it into the path of the sickle bar.

A further object is to construct the attachment so that the grain cut will fall away from the standing grain, and thus leave the path taken by the next cut in the field free of fallen grain.

This invention relates to certain novel features of construction and combinations of parts which will be hereinafter fully described and pointed out in the claims.

In the accompanying drawings:—Figure 1 is a fragmentary view in perspective of the sickle bar of a mowing machine showing my attachment in place thereon, Fig. 2 is a top plan view, and Fig. 3 is a view in side elevation.

The attachment consists of a body A, which at its rear end has a bracket 1 secured. This bracket 1 has a plurality of openings 2 therethrough, and an opening is provided through the body A at a point forward of the bracket. It is the intention that the shoe, as generally supplied with mowers, be removed, and this attachment placed in lieu thereof, and the bolt 3 is passed through the shoe C of the sickle bar D, and through the bracket 1. A bolt or other fastening means 4 is passed through the forward part of the shoe and through the opening in the body A to hold the attachment at that point.

The forward end of the body A is made (in top plan) beveled outwardly so that a point to enter between the standing grain is provided, and a separating arm E is secured to the forward end of the body A. This arm rises at an incline from the body A, and is curved inwardly. Also the body portion A is of sufficient length that the arm E is entirely forward of the sickle bar D.

It is desirable that the forward end of the attachment come in close proximity to the ground over which the mower is traveling, and by placing the bolt 3 through any of the different openings 2 of the bracket 1, the attachment can be adjusted to accommodate itself to a sickle bar placed to cut the crop at a distance from the ground or close to the ground.

It is preferable that both the body portion A and the arm E of the attachment be made of steel, although any other springmetal would accomplish an equally good result.

From the foregoing, it will be seen that I have provided an attachment which can be placed in operative position upon the sickle bar of a standard mower for use in cutting grain or other standing crops, and one which will throw the grain cut away from the standing grain regardless whether it is a tall growth or a comparatively short growth, thus clearing the path for the next successive swath.

Particular difficulty has been experienced in cutting standing crops when the wind is blowing by reason of the fact that the wind carries the cut grain on at least one side of the field against that which is standing. This sometimes necessitates the cutting of a swath along the edge of the standing grain to remove that which has already been cut but remains in a parallel upright position through its support by the standing grain; or it has been necessary to throw this cut grain over away from the standing grain. With my attachment all possibility of the cut grain falling upon the standing grain is precluded, and, as the guide-arm of the attachment is entirely forward of the sickle, any grain which may have fallen or been beaten down by the wind or storms is raised from the ground and brought into the path of the sickle bar.

It is evident that more or less slight changes might be resorted to in the form and arrangement of the several parts described without departure from the spirit and scope of my invention and hence I do not wish to be limited to the exact construction herein set forth, but:—

I claim:

1. An attachment for mowers comprising a body portion, a spreading arm integral with the forward end thereof, and extending rearwardly, upwardly and inwardly, a bracket secured to the rear portion of the body and extending upwardly therefrom and having a plurality of holes therein, a shoe secured at its forward end to the body portion, a bolt adapted to extend through the shoe and one of the holes in the bracket for securing the latter to the bracket, and means for securing the body portion to the sickle-bar of the machine.

2. An attachment adapted to be connected with the sickle bar of a mower comprising a body portion, a shoe connected to the sickle bar to which the body portion is adapted to be attached along its length, a bracket carried by the body portion rearwardly from the point of attachment with the shoe, and provided with a series of openings whereby a second point of attachment to the shoe may be made, and an arm carried by the forward end of the body portion to extend upwardly and inwardly and to be entirely forward of the sickle bar, said body portion and arm preferably of spring-metal.

In testimony whereof I affix my signature in the presence of two witnesses.

HERMANN W. MUELLER.

Witnesses:
INEZ KANE,
M. COPPARD.

Copies of this patent may be obtained for five cents each, by addressing the "Commissioner of Patents, Washington, D. C."